US006906998B1

(12) United States Patent
Mujeeb et al.

(10) Patent No.: US 6,906,998 B1
(45) Date of Patent: Jun. 14, 2005

(54) SWITCHING DEVICE INTERFACES

(75) Inventors: Hamayun Mujeeb, Billerica, MA (US);
Monalisa Agrawal, Norwood, MA
(US); Ayikudy Srikanth, Reading, MA
(US); Moni Matthew, Sharon, MA
(US); Bill Rubino, Chelmsford, MA
(US)

(73) Assignee: Nortel Networks Limited, St. Laurent
(CA)

( * ) Notice: Subject to any disclaimer, the term of this
patent is extended or adjusted under 35
U.S.C. 154(b) by 0 days.

(21) Appl. No.: 09/374,460

(22) Filed: Aug. 13, 1999

(51) Int. Cl.[7] .......................... H04L 12/26; H04L 12/56
(52) U.S. Cl. ..................... 370/218; 370/244; 370/395.1
(58) Field of Search ................................ 370/216, 217,
370/218, 229, 237, 242, 244, 250, 395.1,
226, 401, 297, 238.1, 248

(56) References Cited

U.S. PATENT DOCUMENTS

| 5,436,893 | A | * | 7/1995 | Barnett ........................ 370/392 |
| 5,461,609 | A | * | 10/1995 | Pepper ........................ 370/218 |
| 5,848,227 | A | * | 12/1998 | Sheu ........................... 370/217 |
| 5,889,778 | A | * | 3/1999 | Huscroft et al. ........ 370/395.31 |
| 5,903,544 | A | * | 5/1999 | Sakamoto et al. .......... 370/218 |
| 6,072,806 | A | * | 6/2000 | Khouri et al. .............. 370/465 |
| 6,075,767 | A | * | 6/2000 | Sakamoto et al. .......... 370/228 |
| 6,167,025 | A | * | 12/2000 | Hsing et al. ................. 370/216 |
| 6,208,616 | B1 | * | 3/2001 | Mahalingam et al. ....... 370/216 |
| 6,226,261 | B1 | * | 5/2001 | Hurtta et al. ................ 370/217 |
| 6,246,665 | B1 | * | 6/2001 | Watanabe et al. ........... 370/218 |
| 6,269,149 | B1 | * | 7/2001 | Hassell et al. ............. 379/1.01 |
| 6,311,288 | B1 | * | 10/2001 | Heeren et al. .............. 370/217 |
| 6,359,858 | B1 | * | 3/2002 | Smith et al. ................ 370/217 |
| 6,513,092 | B1 | * | 1/2003 | Gorshe ....................... 710/316 |
| 6,643,254 | B1 | * | 11/2003 | Kajitani et al. ............. 370/217 |

* cited by examiner

*Primary Examiner*—Chau Nguyen
*Assistant Examiner*—Soon D. Hyun
(74) *Attorney, Agent, or Firm*—Neil G.J. Mothew

(57) ABSTRACT

A device is switched from a first physical interface on the device to a second physical interface on the device based on information in an interface redundancy group. The information in the interface redundancy group identifies the first physical interface as a primary interface for the device and the second physical interface as a secondary interface for the device.

43 Claims, 6 Drawing Sheets

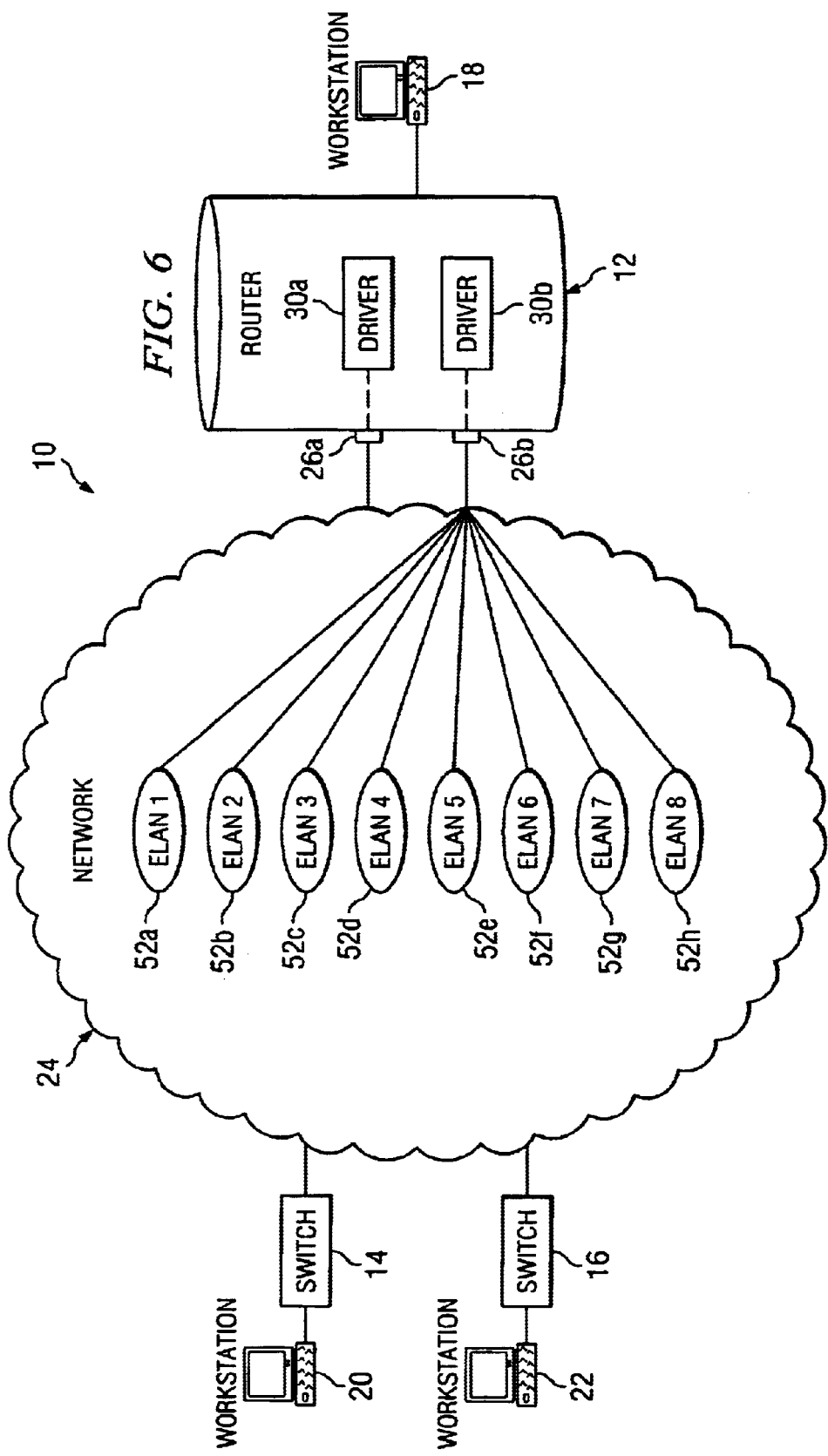

SWITCHING DEVICE INTERFACES

BACKGROUND OF THE INVENTION

This invention relates generally to interfaces on a network device.

Network devices have physical interfaces that are subject to failure. When such an interface fails, a network device can be cut-off from the network. This is particularly problematic in the case of a router, where failure of a single physical interface can make a whole branch of the network inaccessible to other devices.

SUMMARY OF THE INVENTION

In one aspect of the invention, a device is switched from a first physical interface on the device (for example, a failed interface) to a second physical interface on the device based on information in an interface redundancy group. The information in the interface redundancy group identifies the first physical interface as a primary interface for the device and the second physical interface as a secondary interface for the device.

The foregoing aspect of the invention may include one or more of the following features/ functions.

The interface redundancy group may include information defining the primary interface for the device and one or more secondary interfaces for the device. An event may be detected at the first physical interface, and switching may be performed in response to the event. The event may comprise a failure of the first physical interface. The first physical interface may be associated with a driver and a signaling stack, and the failure of the first physical interface may comprise a failure of the driver and/or the signaling stack. The driver and the signaling stack may be monitored in order to detect failures therein. The event may comprise receipt of a slot failure at the first physical interface.

Prior to switching, the second physical interface may operate in a passive mode during which the second physical interface is dormant. Prior to switching, the second physical interface may operate in an active mode during which the second physical interface is communicating over a network. The first physical interface may support one or more network layer interfaces. Following switching, the second physical interface may support the one or more network layer interfaces formerly supported by the first physical interface. The first and second physical interfaces may comprise asynchronous transfer mode ("ATM") physical interfaces. The first and second physical interfaces may be resident on a single network router.

Following switching, the second physical interface may assume responsibilities of the first physical interface. These responsibilities may include routing and/or bridging functions. Following switching, the second physical interface may be configured in a same manner as the first physical interface was configured prior to switching. The device may include a third physical interface, and the interface redundancy group may identify the third physical interface as a tertiary interface. The device may be switched from the second physical interface to the third physical interface in response to an event. Following switching, the third physical interface may assume responsibilities of the first and second physical interfaces. These responsibilities may include routing and/or bridging functions.

In another aspect, physical interfaces on a single device are switched by designating a physical interface on the device as a high priority physical interface, and determining if the high priority physical interface is available. The device is switched from a lower priority physical interface to the high priority physical interface when the high priority physical interface is available.

The foregoing aspect of the invention may include one or more of the following features/functions. Switching may be performed automatically in response to the high priority interface being available. The high priority physical interface may be monitored to determine if the high priority physical interface is available.

In another aspect, a device is switched from a first ATM physical interface on the device to a second ATM physical interface on the device based on information in an interface redundancy group. The information in the interface redundancy group identifies the first ATM physical interface as a primary interface for the device and the second ATM physical interface as a secondary interface for the device. ATM network layer interfaces are established over the second physical interface that correspond to ATM network layer interfaces that were established over the first ATM physical interface prior to switching.

This brief summary has been provided so that the nature of the invention can be understood quickly. A detailed description of illustrative embodiments of the invention is set forth below.

BRIEF DESCRIPTION OF THE DRAWINGS

FIG. 6 shows the configuration of the virtual circuits after the switching performed in FIG. 5.

DESCRIPTION OF THE PREFERRED EMBODIMENT

Figure 1:
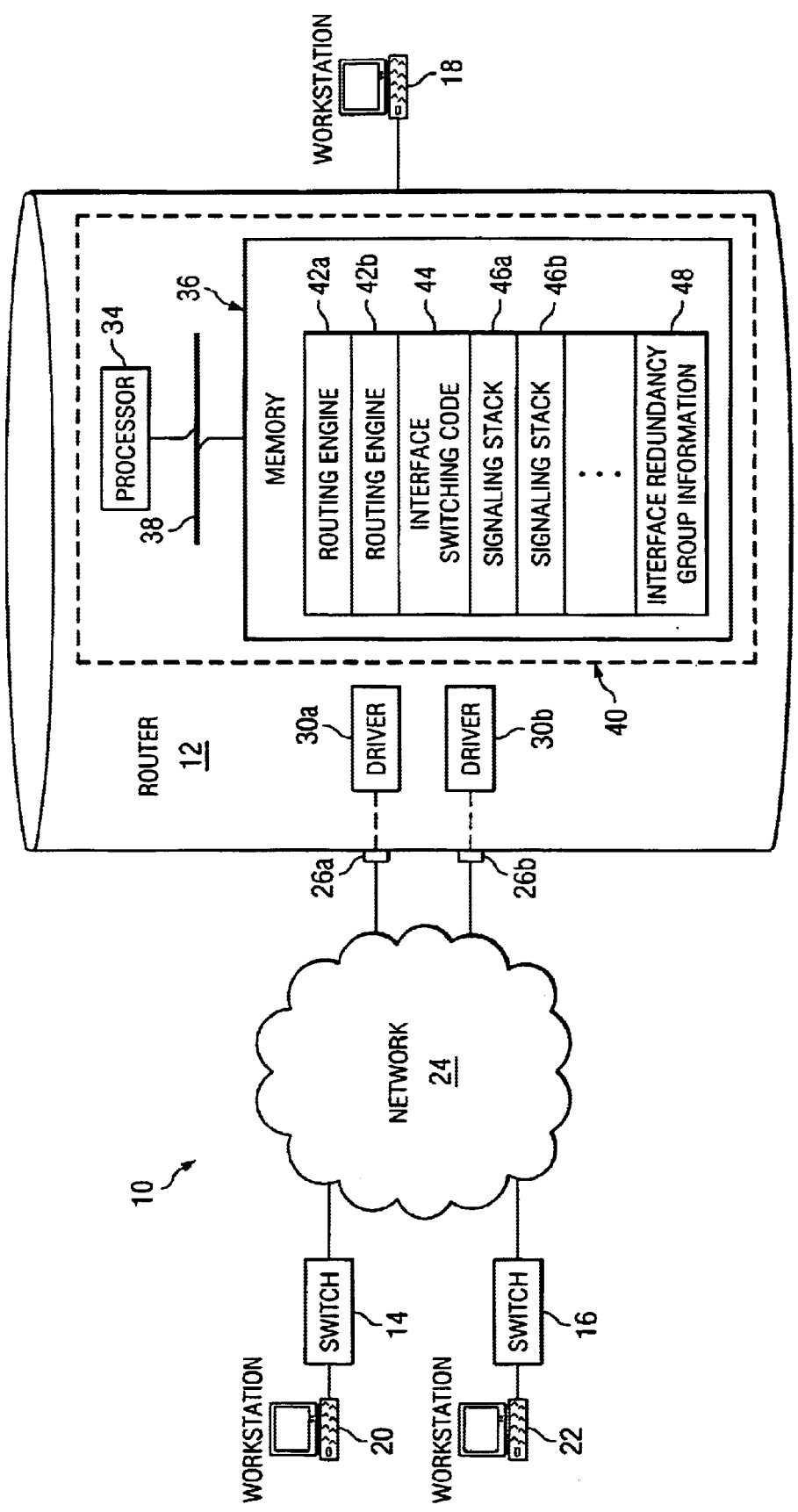
FIG. 1 shows a network system, which includes a router having switchable physical interfaces.

Referring to FIG. 1, a network system 10 is shown. Network system 10 includes router 12, switches 14 and 16, workstations 18, 20 and 22, and network 24.

Network 24 is an asynchronous transfer mode ("ATM") wide area network ("WAN"). ATM is a connection-oriented protocol, meaning that connections are established between devices before data and/or communications can be transmitted between the devices. The network layer interface comprises virtual circuits, over which data packets (in ATM parlance, "cells") are transmitted among devices coupled to network 24, such as router 12 and switches 14 and 16. Virtual circuits can be established by protocols such as ELANs (Emulated Local Area Networks) on network 24.

Switches 14 and 16 interface workstations 20 and 22, respectively, to network 24. Each switch 14 and 16 is an electronic device that routes cells between network 24 and a corresponding workstation. Workstations 18, 20 and 22 are personal computers ("PCs") or other devices that are capable of receiving cells from network 24, processing cells, and transmitting cells to network 24.

Router 12 is a computer or other device that transmits packets/cells among workstations 18, 20 and 22 via network 24. For example, router 12 receives cells/packets from workstation 18 and, based on information in those cells/packets, routes the cells/packets to either workstation 20 or 22 (through an intervening switch and other hardware on network 24).

ATM physical interfaces 26a and 26b are ports provided on router 12 for interfacing to network 24. Although only two such interfaces are shown, any number may be provided. In system 10 of FIG. 1, one of the interfaces (e.g., 26a) is designated as the primary interface for router 12 and the other (e.g., 26b) is designated as the secondary (or backup) interface. When the primary physical interface 26a fails, the secondary physical interface 26b is switched in to take its place. A process to accomplish this is described below.

Physical interfaces 26a and 26b are comprised of wires terminating in connectors, such as an OC-3/OC-12 connector, which mate to corresponding receptacles on router 12. One or more network layer interfaces are established by router 12 over each physical interface 26a and 26b for communication to, and over, network 24. ATM line drivers 30a and 30b transmit cells over corresponding physical interfaces 26a and 26b.

Included in router 12 are a processor 34 and a memory 36 connected by bus 38 (see view 40). Memory 36 stores routing engines 42a and 42b, interface switching code 44, and signaling stacks 46a and 46b. Processor 34 executes instructions in this code to cause router 12 to perform the functions described below. Memory 36 also stores interface redundancy group information 48 (described below).

Signaling stacks 46a and 46b are blocks of code, associated with corresponding physical interfaces 26a and 26b, for establishing virtual connections for the network layer interfaces over the physical interfaces. As noted, one or more network layer interfaces may be configured over a single ATM physical interface 26a and 26b.

Routing engine 42a routes cells over physical interface 26a and routing engine 42b routes cells over physical interface 26b. Routing engines 42a and 42b examine destination information in the cells and route the cells over appropriate interfaces. Examples of routing engines that may be used are "ARE" (ATM Routing Engine) and the 5782 Centillion Multiprotocol Engine.

Interface redundancy group information 48 defines which physical interface is the primary interface (e.g., 26a) and which is the secondary interface (e.g., 26b). This information may be input manually at router 12 via configuration software such as Site Manager® or Bay Command Console® ("BCC"). This software is used by network administrators to configure network devices. Alternatively, interface redundancy group information 48 may be downloaded from a remote location such as network 24 or workstation 18 or set via interface switching code 44.

Interface redundancy group information 48 includes user-defined redundancy groups. These redundancy groups assign priority to the interfaces. In the case of a two-interface router, such as router 12, there are two possible groups. For example, physical interface 26a is configured as the primary interface and physical interface 26b is configured as the secondary interface. The routing engine for each interface is configured to know the role of the interface in each redundancy group. Representative code to configure routing engines is provided in the Appendix.

In routers with more than two physical interfaces, interface redundancy groups become more complicated. Table 1 shows an example of redundancy groups for a router having four physical interfaces "Interface 1", "Interface 2", "Interface 3" and "Interface 4" (not shown).

TABLE 1

| Redundancy Group | Primary Interface | Secondary Interface | Tertiary Interface |
| --- | --- | --- | --- |
| 1 | Interface 1 | Interface 2 | Interface 3 |
| 2 | Interface 2 | Interface 1 | Interface 3 |
| 3 | Interface 4 | Interface 3 | — |

For example, in redundancy group "1", "Interface 1" acts as the primary interface; "Interface 2" acts as the secondary (first backup) interface and is used if "Interface 1" fails; and "Interface 3" acts as the tertiary (or second backup) interface and is used if both "Interfaces 1" and "Interface 2" fail.

Detecting physical interface failure and switching from a primary to a secondary physical interface (or from a secondary to a tertiary physical interface, etc.) is performed by interface switching code 44. The operation of interface switching code 44 differs depending upon whether the secondary interface is in passive mode or active mode.

Passive Mode

In passive mode, prior to switching, the secondary interface is dormant. That is, the secondary interface is not driving/receiving signals to/from network 24. Passive mode may be set as the default mode of router 12 using Site Manager® or BCC®.

Figure 2:
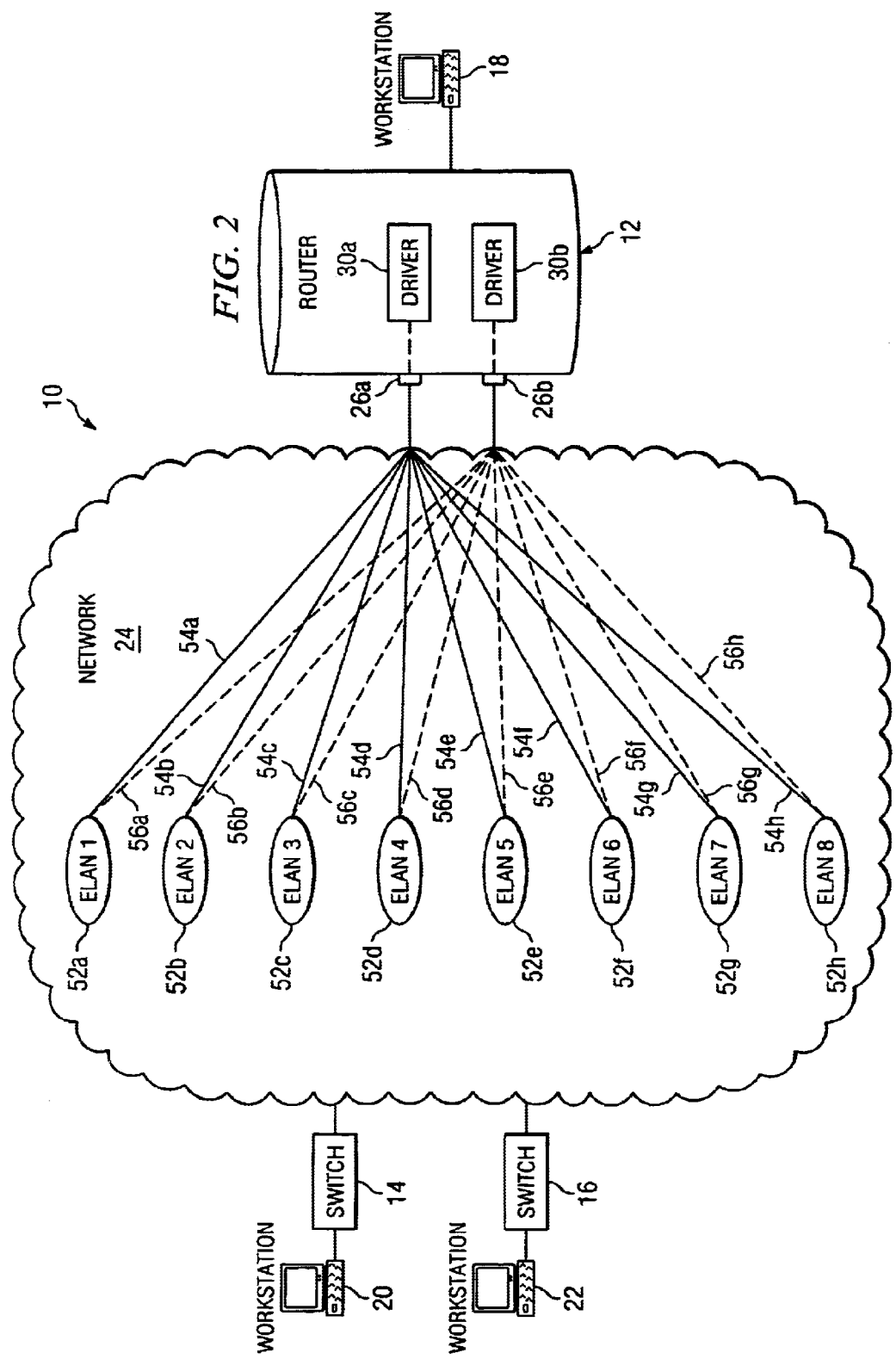
FIG. 2 shows virtual circuits supported by the physical interfaces on the router.

Referring to FIG. 2, a graphical representation of passive mode is shown. In FIG. 2, physical interface 26a is configured as the primary interface and physical interface 26b is configured as the secondary interface in passive mode. This configured is set in interface redundancy group information 48. In FIG. 2, lines 54a to 54h represent connections maintained by primary physical interface 26a and lines 56a to 56h represent connections that are maintained by secondary physical interface 26b after secondary interface 26b takes over the role of primary interface 26b.

Figure 3:
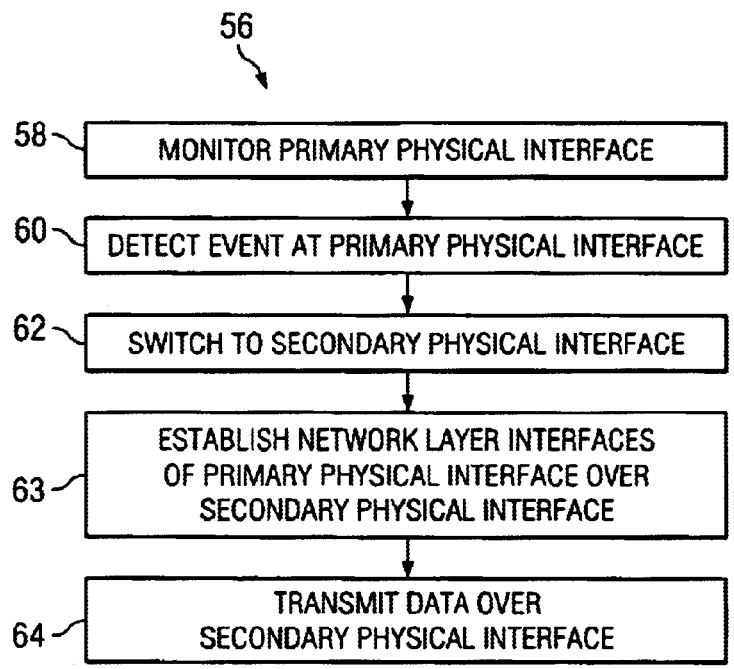
FIG. 3 is a flow diagram showing a process for switching a physical interface on the router in "passive" mode.

Referring to FIG. 3, an interface switching process 56 is shown. Interface switching process 56 is performed by interface switching code 44 to switch from primary physical interface 26a to secondary physical interface 26b. Process 56 monitors 58 primary physical interface 26a, including both driver 30a and signaling stack 46a, for specific "events". These events can include, but are not limited to, receipt of a slot reset at primary physical interface 26a and/or a failure of primary physical interface 26a, such as a failure of driver 30a and/or signaling stack 46a.

In response to detecting 60 one of the foregoing events, process 56 switches 62 from primary physical interface 26a to secondary physical interface 26b (in accordance with interface redundancy group information 48). Switching 62 is performed by enabling driver 30b for secondary physical interface 26b. Following switching, secondary interface 26b establishes 63 the network layer interfaces to network 24 (in this example, ELANs 52a to 52h), and assumes the responsibilities (including routing and bridging services) of primary interface 26b. Switching between interfaces is performed as quickly as possible, e.g., within thirty seconds of failure or reset.

With driver 30b enabled, in 64, signaling stack 46b transmits cells over secondary physical interface 26b to ELANs 52a to 52h. Primary physical interface 26a can be repaired while secondary physical interface 26b performs its functions.

Active Mode

In active mode, prior to switching, the secondary physical interface 26b is already communicating over the network. Following failure of the primary physical interface 26a, the secondary interface 26b assumes the responsibilities of the primary interface 26a. In particular, upon switching, code in the signaling stack establishes the network layer interfaces (e.g., over ELANs) of the primary interface 26a, and assumes the routing and bridging functions of the primary interface 26a.

Figure 4:
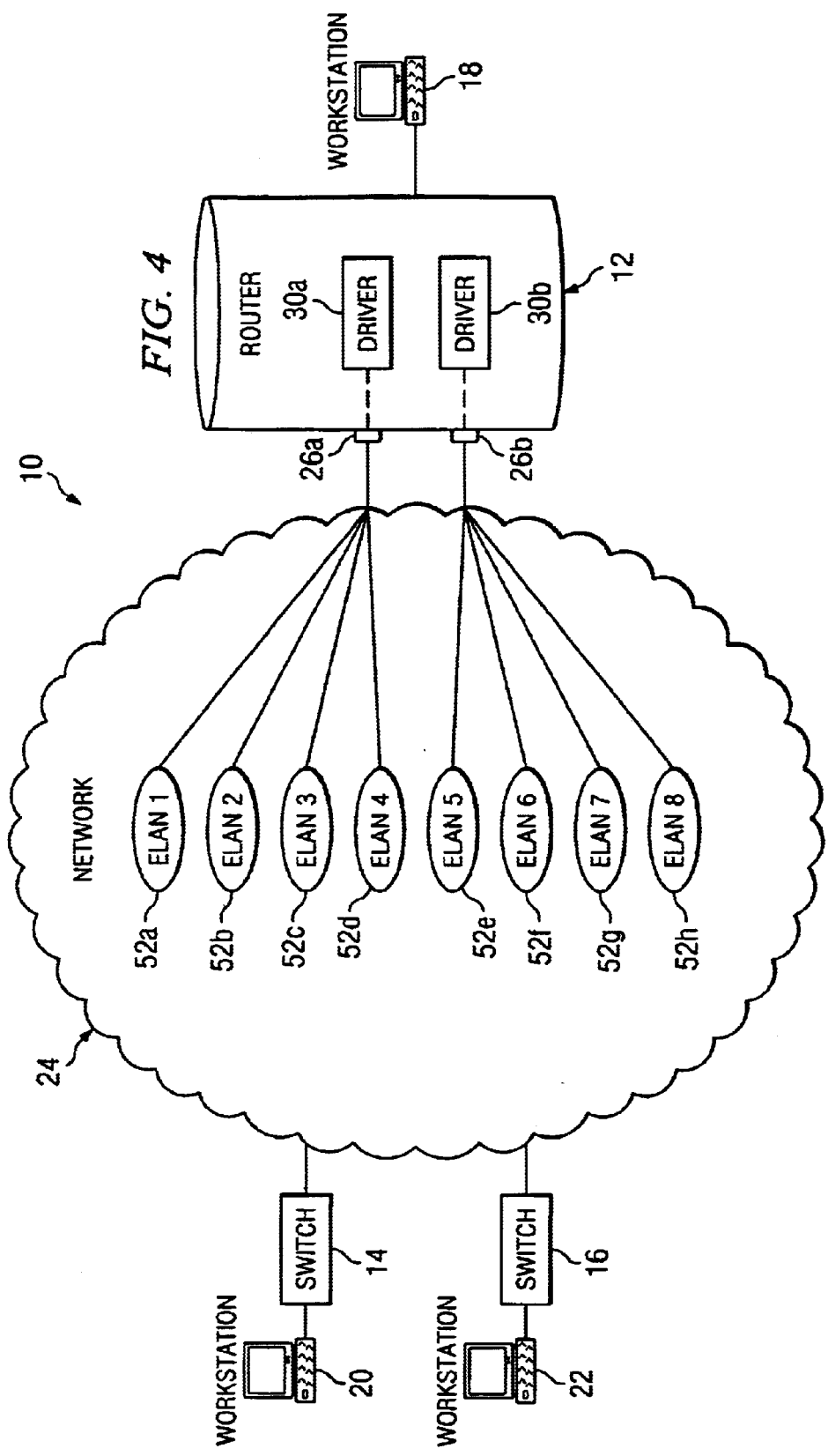
FIG. 4 shows an alternative connection of the virtual circuits to the physical interfaces on the router.

Referring to FIG. 4, a graphical representation of active mode is shown. In FIG. 4, physical interface 26a is the primary interface and physical interface 26b is the secondary interface in active mode. This configuration is set in interface redundancy group information 48. Since secondary physical interface 26b is in active mode, prior to switching, it is providing network layer services over virtual circuits for ELANs 52e to 52h. Primary physical interface 26a is supporting ELANs 52a to 52d.

Figure 5:
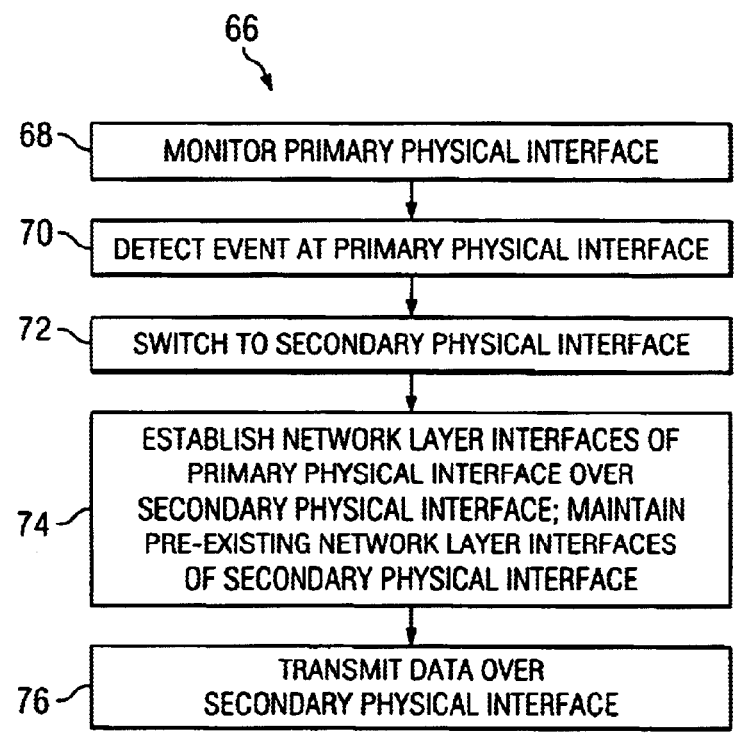
FIG. 5 is a flow diagram showing a process for switching a physical interface on the router in "active" mode.

Referring to FIG. 5, an interface switching process 66 is shown, that is performed by interface switching code 44 to switch from primary physical interface 26a to secondary physical interface 26b. Interface switching process 66 monitors 68 primary physical interface 26a, including both driver 30a and signaling stack 46a, for specific events. These events are the same as those noted above for passive mode.

In response to detecting 70 one of the foregoing events, process 66 switches 72 from primary physical interface 26a to secondary physical interface 26b. Switching is performed in the manner described above; that is, enabling and disabling the drivers for the appropriate network interfaces.

Interface switching process 66 establishes 74, over secondary physical interface 26b, the network layer interfaces (in this case, ELANs 52a to 52d) of primary physical interface 26a. Secondary physical interface 26b continues to perform its original routing and bridging functions over ELANs 52e to 52h. Now, however, secondary physical interface 26b also performs the routing and bridging functions formerly performed by primary physical interface 26a over ELANs 52a to 52d.

With driver 30b enabled, and secondary physical interface 26b switched, in 76, signaling stack 46b transmits cells over secondary physical interface 26b to all of ELANs 52a to 52h. This is shown in FIG. 6. Primary physical interface 26a no longer transmits (hence no lines are shown between this interface and the ELANs in FIG. 6).

Switching Based On Priority

ATM physical interfaces may also be assigned relative priorities and switched on that basis. An option in router 12 may be set, e.g., by a user, to trigger automatic switching based on priority. The priority information upon which switching is based may be included in interface redundancy group information 48, for example.

Figure 7:
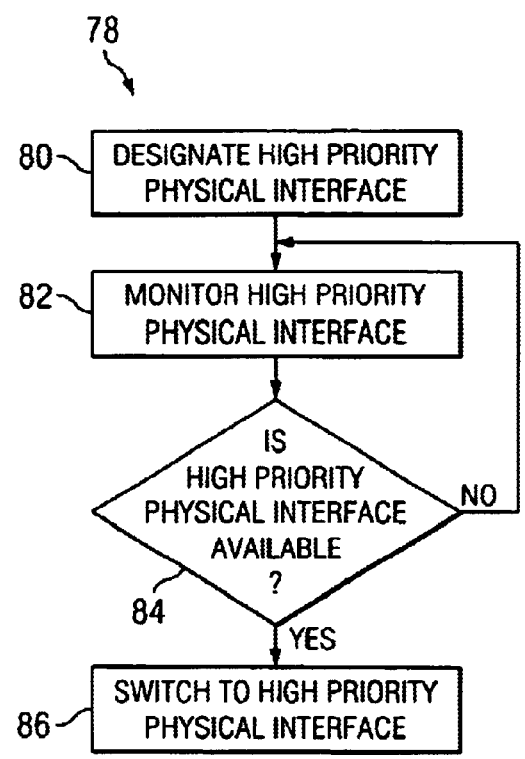
FIG. 7 is a flow diagram showing a process for switching a physical interface on the router based on priority.

Referring to FIG. 7, a process 78 is shown that is performed by interface switching code 44 to switch interfaces based on priority. Process 78 designates 80 any number of physical interfaces on a sliding priority scale, from highest priority to lowest priority. In router 12 (FIG. 2), only two physical interfaces are shown. For the sake of illustration, therefore, physical interface 26a is designated 80 as high priority and physical interface 26b is designated 80 as low priority.

Once physical interfaces 26a and 26b are designated in terms of priority, switching between them may be performed. Process 78 monitors 82 high priority physical interface 26a to determine if it is up and running. If high priority physical interface 26a is available 84 (i.e., it is not "down"), process 78 switches 86 from low priority physical interface 26b to high priority physical interface 26a. As a result, the "best available" interface on router 12 is used to provide network layer connections over network 24. Process 60 may be incorporated into processes 56 and 66 to provide further enhanced switching capabilities.

Figure 8:
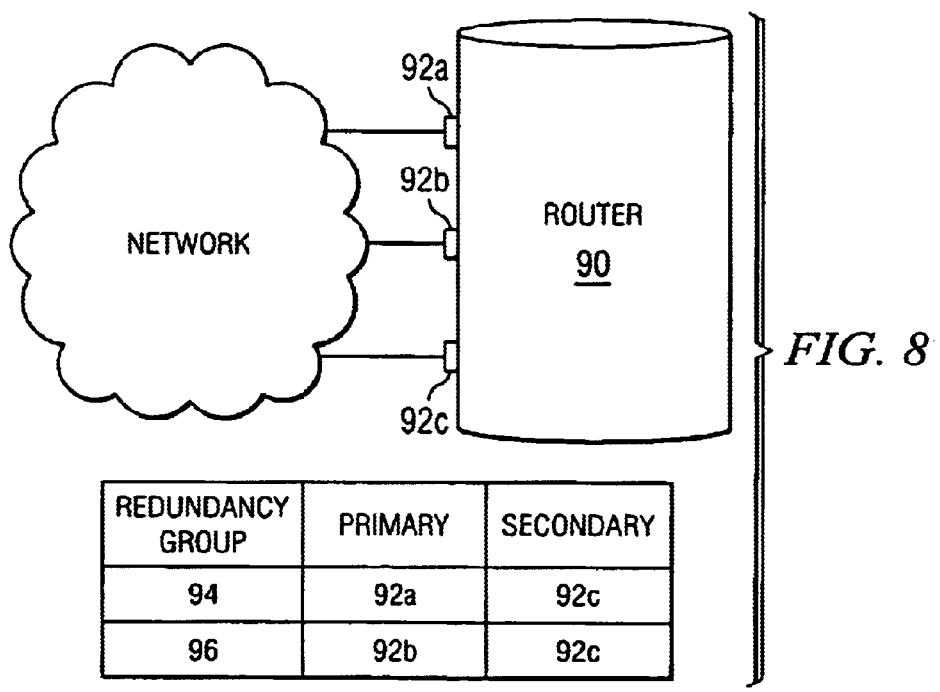
FIG. 8 shows a router having three physical interfaces and redundancy groups therefor.

As noted above, the invention may be used on routers having more than two physical interfaces. For example, in FIG. 8, router 90 has three physical interfaces 92a, 92b and 92c organized into two interface redundancy groups 94 and 96. Interfaces 92a and 92c are in group 94 and interfaces 92b and 92c are in group 96. In this example, interface 92c is a backup for interfaces 92a and 92b. If either of interfaces 92a and 92b fail, then interface 92c will assume the configuration of either (or both of) failed interfaces 92a and 92b.

Switching in the case of more than two interfaces is performed in the same way as described in processes 56, 66 and 78, except that a decision must be made regarding which (lower priority) interface to switch for the primary interface. This decision is made based on interface availability and the priority of the various interfaces.

The invention is not limited to the specific hardware and software configurations described herein. For example, the invention can be used outside the context of ATM WANs, and with network devices other than routers. In this regard, it is to be understood that while the invention has been described in conjunction with the detailed description thereof, the foregoing description is intended to illustrate, and not to limit, the scope of the invention. Other aspects, advantages, and modifications are within the scope of the following claims.

What is claimed is:

1. A method of switching between physical interfaces on a device, the method comprising:

switching from a first physical interface on the device to a second physical interface on the device based on information in an interface redundancy group such that the second physical interface assumes responsibilities of the first physical interface, the responsibilities comprising a one of routing and bridging functions, and wherein the first physical interface is operable for interfacing to a network and the second physical interface is operable for interfacing to the network;

wherein the information in the interface redundancy group comprises a first identifier and a second identifier, the first identifier identifying the first physical interface as a primary interface for the device and the second identifier identifying the second physical interface as a secondary interface for the device, and wherein, prior to switching, the second physical interface operates in a passive mode during which the second physical interface is dormant.

2. A method of switching between physical interfaces on a device, the method comprising:

switching from a first physical interface on the device to a second physical interface on the device based on information in an interface redundancy group such that the second physical interface assumes responsibilities of the first physical interface, the responsibilities comprising a one of routing and bridging functions, and wherein the first physical interface is operable for interfacing to a network and the second physical interface is operable for interfacing to the network;

wherein the information in the interface redundancy group comprises a first identifier and a second identifier, the first identifier identifying the first physical interface as a primary interface for the device and the second identifier identifying the second physical interface as a secondary interface for the device and wherein, prior to switching, the second physical interface operates in an active mode during which the second physical interface is communicating over the network.

3. A method of switching between asynchronous transfer mode (ATM) physical interfaces on a device, the method comprising:

switching from a first ATM physical interface on the device to a second ATM physical interface on the device based on information in an interface redundancy group such that the second ATM physical interface assumes responsibilities of the first ATM physical interface, the responsibilities comprising a one of routing and bridging functions, and wherein the first ATM physical interface is operable for interfacing to a network and the second ATM physical interface is operable for interfacing to the network; and establishing two or more ATM network layer interfaces over the second ATM physical interface that correspond to ATM network layer interfaces that were established over the first ATM physical interface prior to switching;

wherein the information in the interface redundancy group identifies the first ATM physical interface as a primary interface for the device and the second ATM physical interface as a secondary interface for the device.

4. The method of claim 3, wherein the interface redundancy group includes information defining the primary interface for the device and one or more secondary interfaces for the device.

5. The method of claim 3, further comprising detecting an event at the first ATM physical interface;

wherein switching is performed in response to the event.

6. The method of claim 5, wherein the event comprises a failure of the first ATM physical interface.

7. The method of claim 6, wherein the first ATM physical interface is associated with a driver and a signaling stack, and the failure of the first ATM physical interface comprises a failure of a one of the driver and signaling stack.

8. The method of claim 7, further comprising monitoring the driver and the signaling stack in order to detect a failure of the one of the driver and signaling stack.

9. The method of claim 5, wherein the event comprises receipt of a slot failure at the first ATM physical interface.

10. The method of claim 3, wherein, prior to switching, the second ATM physical interface operates in a passive mode during which the second ATM physical interface is dormant.

11. The method of claim 3, wherein, prior to switching, the second ATM physical interface operates in an active mode during which the second ATM physical interface is communicating over the network.

12. A computer program stored on a computer-readable medium for switching between physical interfaces on a device, the computer program comprising instructions that cause a computer to:

switch from a first physical interface on the device to a second physical interface on the device based on information in an interface redundancy group such that the second physical interface assumes responsibilities of the first physical interface, the responsibilities comprising a one of routing and bridging, and wherein the first physical interface is operable for interfacing to a network and the second physical interface is operable for interfacing to the network;

wherein the information in the interface redundancy group comprises a first identifier and a second identifier, the first identifier identifying the first physical interface as a primary interface for the device and the second identifier identifying the second physical interface as a secondary interface for the device and wherein, prior to switching, the second physical interface operates in a passive mode during which the second physical interface is dormant.

13. A computer program stored on a computer-readable medium for switching between physical interfaces on a device, the computer program comprising instructions that cause a computer to:

switch from a first physical interface on the device to a second physical interface on the device based on information in an interface redundancy group such that the second physical interface assumes responsibilities of the first physical interface, the responsibilities comprising a one of routing and bridging, and wherein the first physical interface is operable for interfacing to a network and the second physical interface is operable for interfacing to the network;

wherein the information in the interface redundancy group comprises a first identifier and a second identifier, the first identifier identifying the first physical interface as a primary interface for the device and the second identifier identifying the second physical interface as a secondary interface for the device and wherein, prior to switching, the second physical interface operates in an active mode during which the second physical interface is communicating over the network.

14. A computer program stored on a computer-readable medium for switching between asynchronous transfer mode (ATM) physical interfaces on a device, the computer program comprising instructions that cause a computer to:

switch from a first ATM physical interface on the device to a second ATM physical interface on the device based on information in an interface redundancy group such that the second ATM physical interface assumes responsibilities of the first ATM physical interface, the responsibilities comprising a one of routing and bridging functions, and wherein the first ATM physical interface is operable for interfacing to a network and the second ATM physical interface is operable for interfacing to the network; and establish two or more ATM network layer interfaces over the second ATM physical interface that correspond to ATM network layer interfaces that were established over the first ATM physical interface prior to switching;

wherein the information in the interface redundancy group identifies the first ATM physical interface as a primary interface for the device and the second ATM physical interface as a secondary interface for the device.

15. The computer program of claim 14, wherein the interface redundancy group includes information defining the primary interface for the device and one or more secondary interfaces for the device.

16. The computer program of claim 14, further comprising instructions that cause the computer to detect an event at the first ATM physical interface;

wherein switching is performed in response to the event.

17. The computer program of claim 16, wherein the event comprises a failure of the first ATM physical interface.

18. The computer program of claim 17, wherein the first ATM physical interface is associated with a driver and a signaling stack, and the failure of the first ATM physical interface comprises a failure of a one of the driver and signaling stack.

19. The computer program of claim 18, further comprising instructions that cause the computer to monitor the driver and the signaling stack in order to detect a failure of the one of the driver and signaling stack.

20. The computer program of claim 16, wherein the event comprises receipt of a slot failure at the first ATM physical interface.

21. The computer program of claim 14, wherein, prior to switching, the second ATM physical interface operates in a passive mode during which the second ATM physical interface is dormant.

22. The computer program of claim 14, wherein, prior to switching, the second ATM physical interface operates in an active mode during which the second ATM physical interface is communicating over the network.

23. The computer program of claim 14, wherein the device includes a third ATM physical interface, and the interface redundancy group identifies the third ATM physical interface as a tertiary interface; and
further comprising instructions that cause the computer to switch from the second physical interface to the third physical interface in response to an event.

24. An apparatus which switches between physical interfaces, the apparatus comprising:
a first physical interface operable for interfacing to a network;
a second physical interface operable for interfacing to the network;
a third physical interface operable for interfacing to the network; and
a processor operable for executing instructions to
switch from the first physical interface to the second physical interface based on information in an interface redundancy group such that the second physical interface assumes responsibilities of the first physical interface, the responsibilities comprising a one of routing and bridging functions;
switch from the second physical interface to the third physical interface based on information in the interface redundancy group;
wherein the information in the interface redundancy group identifies the first physical interface as a primary interface for the device, the second physical interface as a secondary interface for the device, and the third physical interface as a tertiary interface for the device and wherein, prior to switching, the second physical interface operates in a passive mode during which the second physical interface is dormant.

25. An apparatus which switches between physical interfaces, the apparatus comprising:
a first physical interface operable for interfacing to a network;
a second physical interface operable for interfacing to the network;
a third physical interface operable for interfacing to the network; and
a processor operable for executing instructions to
switch from the first physical interface to the second physical interface based on information in an interface redundancy group such that the second physical interface assumes responsibilities of the first physical interface, the responsibilities comprising a one of routing and bridging functions;
switch from the second physical interface to the third physical interface based on information in the interface redundancy group;
wherein the information in the interface redundancy group identifies the first physical interface as a primary interface for the device, the second physical interface as a secondary interface for the device, and the third physical interface as a tertiary interface for the device and wherein, prior to switching, the second physical interface operates in an active mode during which the second physical interface is communicating over the network.

26. An apparatus which switches between asynchronous transfer mode (ATM) physical interfaces, the apparatus comprising:
a first ATM physical interface operable for interfacing to a network;
a second ATM physical interface operable for interfacing to the network; and
a processor which executes instructions to:
switch from the first ATM physical interface to the second ATM physical interface based on information in an interface redundancy group such that the second ATM physical interface assumes responsibilities of the first ATM physical interface, the responsibilities comprising a one of routing and bridging functions; and
establish two or more ATM network layer interfaces over the second ATM physical interface that correspond to ATM network layer interfaces that were established over the first ATM physical interface prior to switching;
wherein the information in the interface redundancy group identifies the first ATM physical interface as a primary interface for the device and the second ATM physical interface as a secondary interface for the device.

27. The apparatus of claim 26, wherein the interface redundancy group includes information defining the primary interface for the apparatus and one or more secondary interfaces for the apparatus.

28. The apparatus of claim 26, wherein:
the processor detects an event at the first ATM physical interface; and
switching is performed in response to the event.

29. The apparatus of claim 28, wherein the event comprises a failure of the first ATM physical interface.

30. The apparatus of claim 29, wherein the first ATM physical interface is associated with a driver and a signaling stack, and the failure of the first ATM physical interface comprises a failure of a one of the driver and signaling stack.

31. The apparatus of claim 30, wherein the processor executes instructions to monitor the driver and the signaling stack in order to detect a failure of the one of the driver and signaling stack.

32. The apparatus of claim 28, wherein the event comprises receipt of a slot failure at the first ATM physical interface.

33. The apparatus of claim 26, wherein, prior to switching, the second ATM physical interface operates in a passive mode during which the second ATM physical interface is dormant.

34. The apparatus of claim 26, wherein, prior to switching, the second ATM physical interface operates in an active mode during which the second ATM physical interface is communicating over the network.

35. A method of switching between asynchronous transfer mode (ATM) physical interfaces on a device, the method comprising:
   switching from a first ATM physical interface on the device to a second ATM physical interface on the device based on information in an interface redundancy group, the first ATM physical interface associated with a driver and a signaling stack;
   establishing two or more ATM network layer interfaces over the second ATM physical interface that correspond to ATM network layer interfaces that were established over the first ATM physical interface prior to switching, and wherein the information in the interface redundancy group identifies the first ATM physical interface as a primary interface for the device and the second ATM physical interface as a secondary interface for the device; and
   detecting an event at the first ATM physical interface wherein the switching is performed in response to the event, and the event comprises a failure of the first ATM physical interface, and the failure of the first ATM physical interface comprises a failure of a one of the driver and signaling stack.

36. The method of claim 35, further comprising monitoring the driver and the signaling stack in order to detect a failure of the one of the driver and signaling stack.

37. A method of switching between asynchronous transfer mode (ATM) physical interfaces on a device, the method comprising:
   switching from a first ATM physical interface on the device to a second ATM physical interface on the device based on information in an interface redundancy group;
   establishing two or more ATM network layer interfaces over the second ATM physical interface that correspond to ATM network layer interfaces that were established over the first ATM physical interface prior to switching, and wherein the information in the interface redundancy group identifies the first ATM physical interface as a primary interface for the device and the second ATM physical interface as a secondary interface for the device; and
   detecting an event at the first ATM physical interface and wherein the switching is performed in response to the event, and the event comprises receipt of a slot failure at the first ATM physical interface.

38. A computer program stored on a computer-readable medium for switching between asynchronous transfer mode (ATM) physical interfaces on a device, the computer program comprising instructions that cause a computer to:
   switch from a first ATM physical interface on the device to a second ATM physical interface on the device based on information in an interface redundancy group, the first ATM physical interface associated with a driver and a signaling stack;
   establish two or more ATM network layer interfaces over the second ATM physical interface that correspond to ATM network layer interfaces that were established over the first ATM physical interface prior to switching, and wherein the information in the interface redundancy group identifies the first ATM physical interface as a primary interface for the device and the second ATM physical interface as a second interface for the device; and
   detect an event at the first ATM physical interface and wherein the switching is performed in response to the event, and the event comprises a failure of the first ATM physical interface, and the failure of the first ATM physical interface comprises a failure of a one of the driver and signaling stack.

39. The computer program of claim 38, further comprising instructions that cause the computer to monitor the driver and the signaling stack in order to detect a failure of a one of the driver and signaling stack.

40. A computer program stored on a computer-readable medium for switching between asynchronous transfer mode (ATM) physical interfaces on a device, the computer program comprising instructions that cause a computer to:
   switch from a first ATM physical interface on the device to a second ATM physical interface on the device based on information in an interface redundancy group;
   establish two or more ATM network layer interfaces over the second ATM physical interface that correspond to ATM network layer interfaces that were established over the first ATM physical interface prior to switching, and wherein the information in the interface redundancy group identifies the first ATM physical interface as a primary interface for the device and the second ATM physical interface as a secondary interface for the device; and
   detect an event at the first ATM physical interface and wherein the switching is performed in response to the event, and the event comprises receipt of a slot failure at the first ATM physical interface.

41. An apparatus which switches between asynchronous transfer mode (ATM) physical interfaces, the apparatus comprising:
   a first ATM physical interface;
   a second ATM physical interface;
   a third ATM physical interface; and
   a processor operable for executing instructions to:
      switch from the first ATM physical interface to the second ATM physical interface based on information in an interface redundancy group;
      establish ATM network layer interfaces over the second ATM physical interface that correspond to ATM network layer interfaces that were established over the first ATM physical interface prior to switching;
      detect a first event at the first ATM physical interface and wherein the switching from the first ATM physical interface to the second ATM physical interface is performed in response to the first event;
      switch from the second ATM physical interface to the third ATM physical interface based on information in an interface redundancy group;
      establish ATM network layer interfaces over the third ATM physical interface that correspond to ATM network layer interfaces that were established over the second ATM physical interface prior to switching;
      detect a second event at the second ATM physical interface and wherein the switching from the second ATM physical interface to the third ATM physical interface is performed in response to the second event;
      wherein the information in the interface redundancy group identifies the first ATM physical interface as a primary interface for the device, the second ATM physical interface as a secondary interface for the device, and the third ATM physical interface as a tertiary interface for the device.

42. The apparatus of claim 41, wherein the first ATM physical interface is associated with a first driver and a first signaling stack;

the second ATM physical interface is associated with a second driver and a second signaling stack;

the processor executes instructions to monitor the first and second drivers and the first and second signaling stacks in order to detect a failure of a one of the drivers and signaling stacks; and wherein the first event comprises a failure of a one of the first driver and first signaling stack and the second event comprises a failure of a one of the second driver and second signaling stack.

43. The apparatus of claim 41, wherein the first event comprises a receipt of a slot failure at the first ATM physical interface and the second event comprises receipt of a slot failure at the second ATM physical interface.

* * * * *